(12) United States Patent
Nagafuchi

(10) Patent No.: US 12,191,665 B2
(45) Date of Patent: Jan. 7, 2025

(54) SYSTEM OPERATOR SIDE COMPUTER, POWER GENERATION OPERATOR SIDE COMPUTER, POWER SYSTEM, CONTROL METHOD, AND PROGRAM

(71) Applicant: Mitsubishi Power, Ltd., Yokohama (JP)

(72) Inventor: Naoyuki Nagafuchi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 497 days.

(21) Appl. No.: 17/562,554

(22) Filed: Dec. 27, 2021

(65) Prior Publication Data

US 2022/0123553 A1   Apr. 21, 2022

Related U.S. Application Data

(62) Division of application No. 16/764,568, filed as application No. PCT/JP2018/042707 on Nov. 19, 2018, now abandoned.

(30) Foreign Application Priority Data

Nov. 20, 2017   (JP) ................. 2017-222706

(51) Int. Cl.
*H02J 3/14*    (2006.01)
*G06Q 50/06*    (2024.01)
(Continued)

(52) U.S. Cl.
CPC ............... *H02J 3/144* (2020.01); *H02J 3/00* (2013.01); *H02J 3/003* (2020.01); *H02J 3/004* (2020.01);
(Continued)

(58) Field of Classification Search
CPC ........ H02J 3/003; H02J 3/004; H02J 2203/20; H02J 3/144; H02J 2310/64; H02J 3/00;
(Continued)

(56) References Cited

U.S. PATENT DOCUMENTS

2011/0231028 A1* 9/2011 Ozog .................. H02J 3/14
  700/291
2013/0274936 A1* 10/2013 Donahue ........... H02J 13/00034
  700/291

(Continued)

FOREIGN PATENT DOCUMENTS

JP   2001-86645   3/2001
JP   2002-135976   5/2002
(Continued)

OTHER PUBLICATIONS

International Search Report issued Feb. 5, 2019 in International (PCT) Application No. PCT/JP2018/042707, with English language translation.

(Continued)

*Primary Examiner* — Ziaul Karim
(74) *Attorney, Agent, or Firm* — Wenderoth, Lind & Ponack, L.L.P.

(57) ABSTRACT

A system operator side computer includes: a supply amount acquirer configured to acquire a maximum suppliable power amount from a power generation operator at a predetermined time later; a demand specifier configured to specify a power demand at the predetermined time later; and a shortage amount calculator configured to calculate a power shortage amount based on the power demand and the maximum suppliable power amount.

11 Claims, 4 Drawing Sheets

(51) Int. Cl.
*H02J 3/00* (2006.01)
*H02J 3/38* (2006.01)
*H02J 13/00* (2006.01)

(52) U.S. Cl.
CPC .......... *H02J 3/38* (2013.01); *H02J 13/00002* (2020.01); *G06Q 50/06* (2013.01); *H02J 2203/20* (2020.01)

(58) Field of Classification Search
CPC ....... H02J 3/38; G06Q 50/06; Y02B 70/3225; Y02E 40/70; Y04S 20/222; Y04S 10/50
See application file for complete search history.

(56) References Cited

U.S. PATENT DOCUMENTS

| | | | | |
|---|---|---|---|---|
| 2013/0345884 | A1* | 12/2013 | Forbes, Jr. | H02J 13/00028 700/286 |
| 2013/0346768 | A1* | 12/2013 | Forbes, Jr. | H02J 3/48 713/310 |
| 2014/0018969 | A1* | 1/2014 | Forbes, Jr. | H02J 13/00028 700/295 |
| 2014/0074311 | A1* | 3/2014 | Kearns | H02J 3/38 700/297 |
| 2014/0163754 | A1* | 6/2014 | Potter | H02J 3/32 700/287 |
| 2014/0172503 | A1* | 6/2014 | Hammerstrom | G05B 15/02 705/7.31 |
| 2016/0013645 | A1* | 1/2016 | Matsuda | G06Q 10/06 700/287 |
| 2016/0323736 | A1* | 11/2016 | Donahue | H04L 63/061 |
| 2017/0237289 | A1* | 8/2017 | Thompson | H02J 13/00016 700/296 |
| 2018/0040079 | A1 | 2/2018 | Kishi et al. | |

FOREIGN PATENT DOCUMENTS

| | | |
|---|---|---|
| JP | 2010-130762 | 6/2010 |
| JP | 2013-66320 | 4/2013 |
| JP | 2015-8588 | 1/2015 |
| JP | 2016-77051 | 5/2016 |
| JP | 2016-163431 | 9/2016 |

OTHER PUBLICATIONS

Written Opinion of the International Search Authority issued Feb. 5, 2019 in International (PCT) Application No. PCT/JP2018/042707, with English language translation.
Office Action issued Jun. 15, 2021, in U.S. Appl. No. 16/764,568.
Office Action issued Sep. 28, 2021, in U.S. Appl. No. 16/764,568.

* cited by examiner

SYSTEM OPERATOR SIDE COMPUTER, POWER GENERATION OPERATOR SIDE COMPUTER, POWER SYSTEM, CONTROL METHOD, AND PROGRAM

TECHNICAL FIELD

The present invention relates to a system operator side computer, a power generation operator side computer, a power system, a control method, and a program.

This application is a continuation application of patent application Ser. No. 16/764,568 filed in the United States Patent and Trademark Office on May 15, 2020, which is a national phase application of PCT Application No. PCT/JP2018/042707 that was filed on Nov. 19, 2018, which claims priority to Japanese Patent Application No. 2017-222706, filed Nov. 20, 2017, which the entire contents of which are hereby incorporated by reference.

BACKGROUND ART

In power generation systems, power generated by various methods is supplied to electric power systems. As one of the power supplied to the electric power systems, power generated using renewable energy can be exemplified.

As a related technology, Patent Literature 1 discloses a technology for predicting a power demand and a power generation amount from weather data and determining a supply-demand balance.

As a related technology, Patent Literature 2 discloses a technology for predicting a power demand and calculating a power generation amount (a demand response amount) for reducing consumption at the time of a power shortage by using weather data.

CITATION LIST

Patent Literature

[Patent Literature 1]
Japanese Unexamined Patent Application, First Publication No. 2015-008588
[Patent Literature 2]
Japanese Unexamined Patent Application, First Publication No. 2016-077051

SUMMARY OF INVENTION

Technical Problem

Incidentally, as demand response known as a policy of reducing a power consumption amount at the time of a power shortage, a reduction in power consumption by consumers corresponding to the power shortage is requested and incentives to increase or decrease the power consumption is provided. In order to perform the demand response appropriately, it is necessary to accurately specify a maximum suppliable power amount.

Therefore, in a power system, a technology capable of accurately specifying the maximum suppliable power amount is requested.

To solve the foregoing problem, an objective of the present invention is to provide a system operator side computer, a power generation operator side computer, a power system, a control method, and a program.

Solution to Problem

According to a first aspect of the present invention, a system operator side computer includes: a supply amount acquirer configured to acquire a maximum suppliable power amount from a power generation operator at a predetermined time later; a demand specifier configured to specify a power demand at the predetermined time later; and a shortage amount calculator configured to calculate a power shortage amount based on the power demand and the maximum suppliable power amount.

According to a second aspect of the present invention, in the system operator side computer according to the first aspect, the shortage amount calculator may be configured to calculate the shortage power amount based on weather.

According to a third aspect of the present invention, the system operator side computer according to the first or second aspect may further include a demand response unit configured to transmit a power shortage amount with respect to a required power amount and an incentive with respect to the power shortage amount to a request source of the requested power amount when the requested power amount is not suppliable.

According to a fourth aspect of the present invention, a power generation operator side computer includes: a request acquirer configured to acquire a request for a maximum suppliable power amount from a system operator at a predetermined time later; a supply amount specifier configured to calculate the maximum suppliable power amount at the predetermined time later; and a supply amount notifier configured to notify the system operator of the calculated maximum suppliable power amount.

According to a fifth aspect of the present invention, in the power generation operator side computer according to the fourth aspect, the supply amount specifier may be configured to calculate the maximum suppliable power amount based on profit and loss when an amount of generated power is increased.

According to a sixth aspect of the present invention, the power generation operator side computer according to the fourth or fifth aspect may further include a demand response unit configured to transmit a power shortage amount with respect to a requested power amount and an incentive with respect to the power shortage amount to a request source of the requested power amount when the requested power amount is not suppliable.

According to a seventh aspect of the present invention, a power system includes a system operator side computer and a power generation operator side computer. The system operator side computer includes a supply amount acquirer configured to acquire a maximum suppliable power amount from a power generation operator at a predetermined time later, a demand specifier configured to specify a power demand at the predetermined time later, and a shortage amount calculator configured to calculate a power shortage amount based on the power demand and the maximum suppliable power amount. The power generation operator side computer includes a request acquirer configured to acquire a request for the maximum suppliable power amount from a system operator at the predetermined time later, a supply amount specifier configured to calculate the maximum suppliable power amount at the predetermined time later, and a supply amount notifier configured to notify the system operator of the calculated maximum suppliable power amount.

According to an eighth aspect of the present invention, there is provided a control method by a system operator side computer. The method includes: acquiring a maximum suppliable power amount from a power generation operator at a predetermined time later; specifying a power demand at the predetermined time later; and calculating a power shortage amount based on the power demand and the maximum suppliable power amount.

According to a ninth aspect of the present invention, there is provided a control method by a power generation operator side computer. The method includes: acquiring a request for a maximum suppliable power amount from a system operator at a predetermined time later; calculating the maximum suppliable power amount at the predetermined time later; and notifying the system operator of the calculated maximum suppliable power amount.

According to a tenth aspect of the present invention, there is provided a control method by a power system. The method includes: acquiring a maximum suppliable power amount from a power generation operator at a predetermined time later; specifying a power demand at the predetermined time later; calculating a power shortage amount based on the power demand and the maximum suppliable power amount; acquiring a request for the maximum suppliable power amount from a system operator at the predetermined time later; calculating the maximum suppliable power amount at the predetermined time later; and notifying the system operator of the calculated maximum suppliable power amount.

According to an eleventh aspect of the present invention, a program causes a system operator side computer to perform: acquiring a maximum suppliable power amount from a power generation operator at a predetermined time later; specifying a power demand at the predetermined time later; and calculating a power shortage amount based on the power demand and the maximum suppliable power amount.

According to a twelfth aspect of the present invention, a program causes a power generation operator side computer to perform: acquiring a request for a maximum suppliable power amount from a system operator at a predetermined time later; calculating the maximum suppliable power amount at the predetermined time later; and notifying the system operator of the calculated maximum suppliable power amount.

Advantageous Effects of Invention

A system operator side computer, a power generation operator side computer, a power system, a control method, and a program according to embodiments of the present invention can accurately specify a suppliable maximum power amount in the power system.

DESCRIPTION OF EMBODIMENTS

Embodiment

Hereinafter, an embodiment will be described in detail with reference to the drawings.

A configuration of a power system 1 according to an embodiment of the present invention will be described.

The power system 1 is a system that predicts a power amount that can be supplied to consumers based on information regarding the weather (including a temperature, an atmospheric pressure, a humidity, and a rainfall amount) and controls supply of power to the consumers. The power system 1 is a system that requests a power generation operator to generate power corresponding to a shortage when an amount of power supplied to consumers is insufficient, and suppresses an amount of power consumption by consumers, that is, performs demand response when the amount of power supplied to consumers is insufficient even though an amount of generated power is increased in response to the request.

Figure 1:
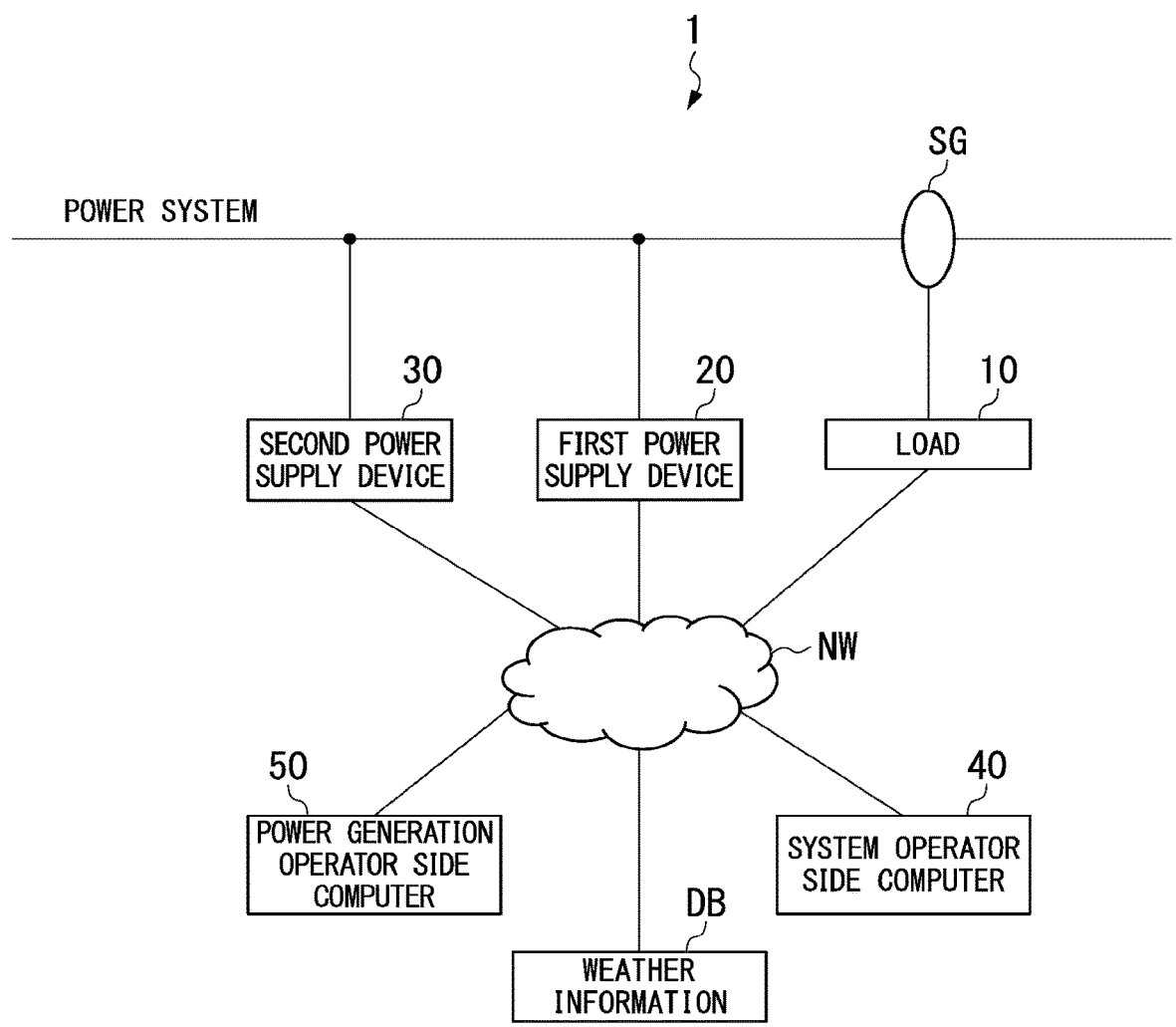
FIG. 1 is a diagram illustrating a configuration of a power system according to an embodiment of the present invention.

As illustrated in FIG. 1, the power system 1 according to an embodiment of the present invention includes a load 10, a first power supply device 20 (an example of a power generation device), a second power supply device 30 (an example of a power generation device), a system operator side computer 40, and a power generation operator side computer 50.

The load 10 is a device that is used by a consumer and consumes power. The load 10 is, for example, a household electric appliance used in one or more ordinary homes.

In the embodiment of the present invention, a manager that manages power supplied to the load 10 is referred to as a "system operator." The system operator manages, for example, power supplied in units of the loads 10 connected to the smart grid SG.

The first power supply device 20 is a power supply device of which an amount of generated power varies depending on weather. The first power supply device 20 is, for example, a device that supplies power generated using renewable energy such as solar energy, wind energy, or hydroelectric energy to the load 10.

The first power supply device 20 is a device that is owned by at least one of a consumer and the system operator.

The second power supply device 30 is a device that can control an amount of generated power irrespective of weather and is a device that can supply predetermined generated power to the load 10 and increase or decrease the power supplied to the load 10 with reference to the predetermined power. The second power supply device 30 is a device that is owned by a power generation operator, is, for example, a device that supplies power generated by such as thermal power generation using a fossil fuel, and is specifically a device that supplies power generated using a gas turbine. A normal time in an embodiment of the present invention is a state in which power generated by the first power supply device 20 and the second power supply device 30 is supplied to the load 10 and power supplied to the load 10 by the second power supply device 30 can be increased or decreased.

The system operator side computer 40 is a computer that transmits a power shortage amount to the power generation operator side computer 50 at a normal time when power to be supplied to the load 10 is predicted to be insufficient.

Figure 2:
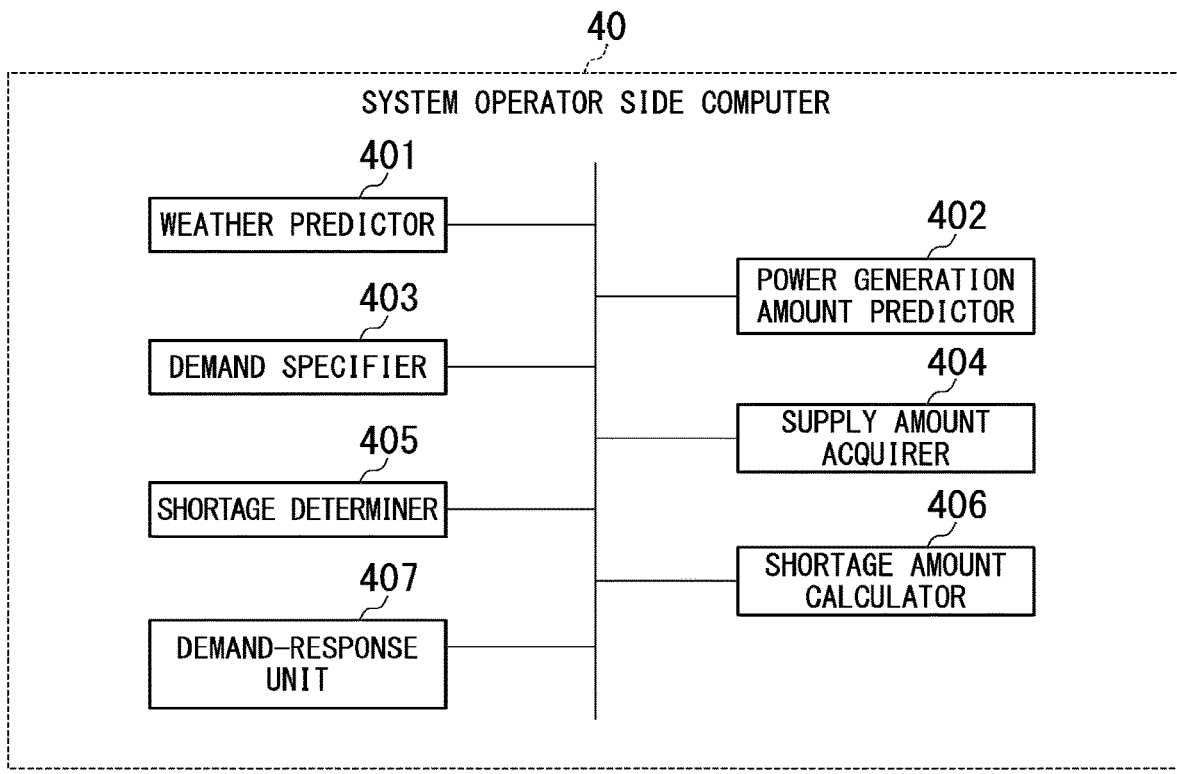
FIG. 2 is a diagram illustrating a configuration of a system operator side computer according to the embodiment of the present invention.

As illustrated in FIG. 2, the system operator side computer 40 includes a weather predictor 401, a power generation amount predictor 402, a demand specifier 403, a supply amount acquirer 404, a shortage determiner 405, a shortage amount calculator 406, and a demand response unit 407.

The weather predictor 401 acquires weather information indicating a prediction of the weather at a predetermined time later from a database DB or the like of a company providing the weather information, for example, via a communication line NW such as the Internet. The phrase "at the predetermined time later" is, for example, after 1 hour, after 30 minutes, after 10 minutes, after 5 minutes, or the like.

The power generation amount predictor 402 predicts an amount of generated power of the first power supply device 20 at the predetermined time later based on the weather information acquired by the weather predictor 401. Specifically, for example, the power generation amount predictor 402 predicts an amount of generated power of the first power supply device 20 at the predetermined time later based on the weather acquired by the weather predictor 401 and past results of the amount of generated power, such as an amount of light received according to weather.

The demand specifier 403 specifies a power demand at the predetermined time later. For example, the demand specifier 403 specifies the power demand at the predetermined time later based on a past result of an amount of power consumption and the weather acquired by the weather predictor 401, such as working of an air conditioner according to temperature.

When the power supplied to the load 10 at the predetermined time later is predicted to be insufficient at a normal time, the supply amount acquirer 404 transmits a request for a maximum suppliable power amount which can be supplied at the predetermined time later to the power generation operator side computer 50. At this time, the supply amount acquirer 404 transmits the request for the maximum suppliable power amount which can be supplied at the predetermined time later and simultaneously transmits information regarding a fee corresponding to an increase in the supplied power. The supply amount acquirer 404 acquires the maximum suppliable power amount at the predetermined time later from the power generation operator.

The shortage determiner 405 determines whether a power demand at the predetermined time later is greater than the maximum suppliable power amount at the predetermined time later.

Subsequently, when the power demand at the predetermined time later is greater than the maximum suppliable power amount at the predetermined time later, the shortage amount calculator 406 calculates a difference between the power demand at the predetermined time later and a total sum of an amount of power generated by the first power supply device 20 at the predetermined time later and the maximum suppliable power amount at the predetermined time later as a power shortage amount.

When the received maximum suppliable power amount is less than an amount of power necessary in the load 10, the demand response unit 407 transmits a request for demand response (providing an incentive along with a request for reducing an amount of power consumption at the time of power shortage) to each consumer.

The power generation operator side computer 50 is a computer that determines whether to generate an amount of power corresponding to the power shortage amount transmitted from the system operator side computer 40 and transmits a determination result to the system operator side computer 40.

Figure 3:
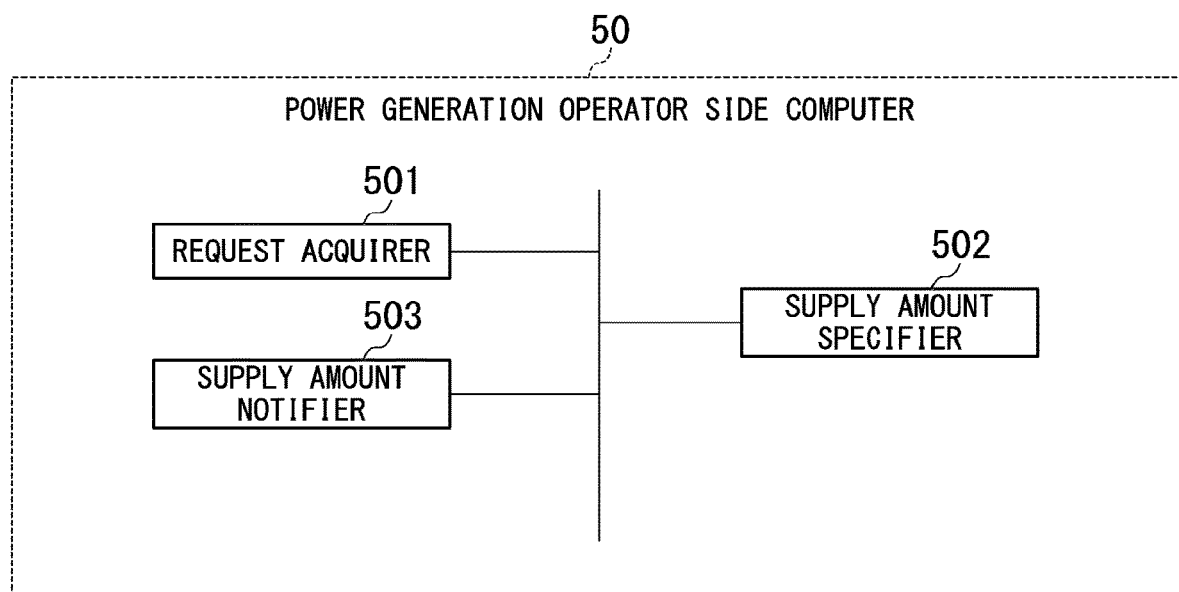
FIG. 3 is a diagram illustrating a configuration of a power generation operator side computer according to the embodiment of the present invention.

As illustrated in FIG. 3, the power generation operator side computer 50 includes a request acquirer 501, a supply amount specifier 502, and a supply amount notifier 503.

The request acquirer 501 acquires a request for the maximum suppliable power amount at the predetermined time later from the system operator.

The supply amount specifier 502 calculates the maximum suppliable power amount at the predetermined time later.

Specifically, the supply amount specifier 502 calculates how much a residual lifetime of the second power supply device 30 will decrease when the amount of generated power is increased, and calculates a cost (for example, an increase in a cost required to exchange components, a decrease in a profit occurring with a reduction in a driving opportunity accompanied by exchange of components, or the like) when the number of maintenances occurring due to the decrease of the residual lifetime increases of maintenance is performed due to the decrease of the residual lifetime during a periodic inspection period. The supply amount specifier 502 calculates how much a profit is obtained with an amount of generated power corresponding to the increase when the amount of generated power is increased. The supply amount specifier 502 calculates how much a profit is obtained with regard to a plurality of amounts of generated power by setting a possible amount of generated power as an upper limit. Then, the supply amount specifier 502 sets, for example, an amount of generated power with which a maximum profit can be obtained among the amounts of generated power in which the profit is greater than a loss caused due to a maintenance cost as the maximum suppliable power amount. The supply amount specifier 502 calculates a current suppliable power amount (zero in the embodiment of the present invention) as the maximum suppliable power amount at the predetermined time later when there is no amount of generated power in which the profit is greater than the loss caused due to the maintenance cost.

The supply amount notifier 503 notifies the system operator of the maximum suppliable power amount at the predetermined time later calculated by the supply amount specifier 502 by transmitting the maximum suppliable power amount to the system operator side computer 40.

Figure 4:
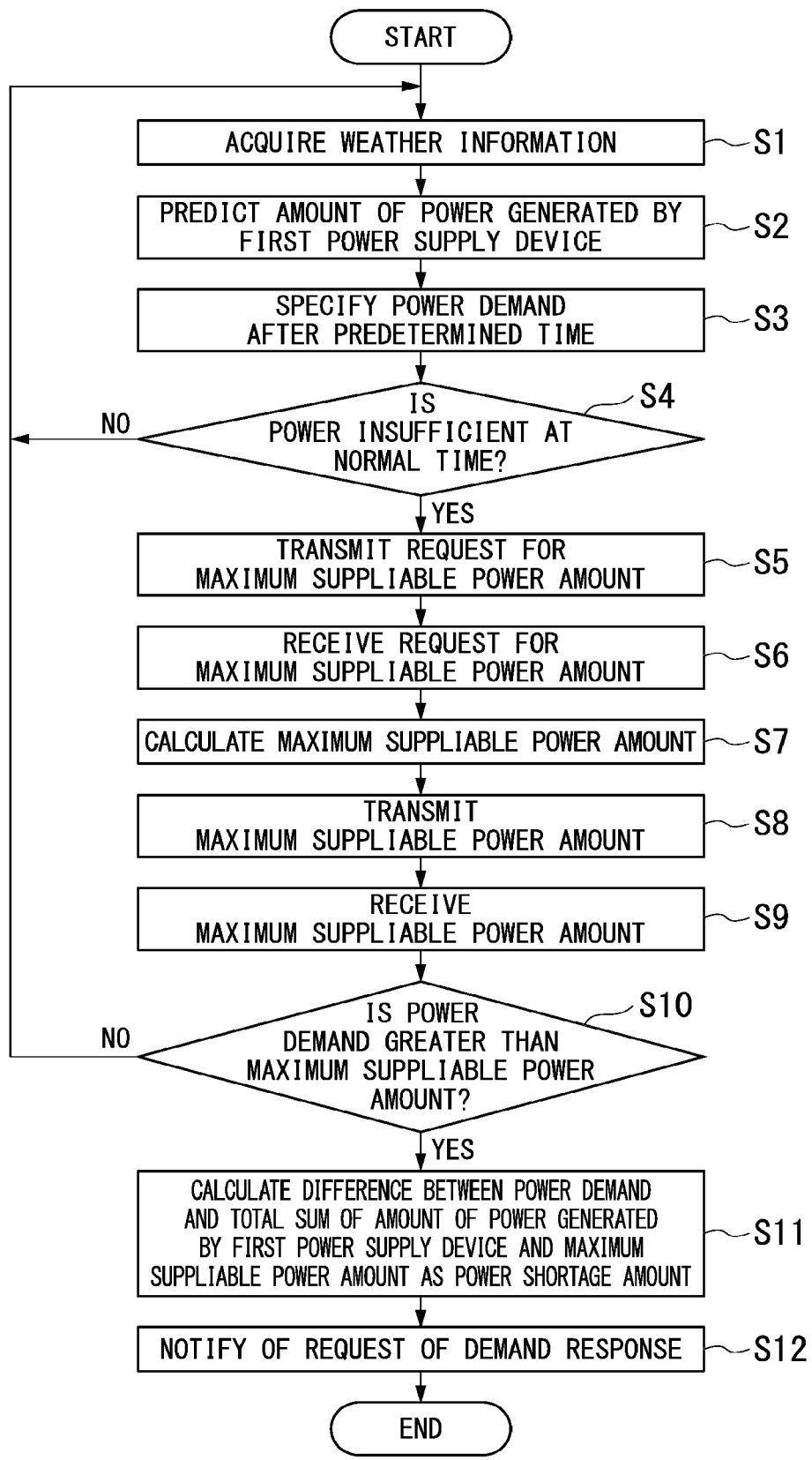
FIG. 4 is a diagram illustrating a process flow of the power system according to the embodiment of the present invention.

Next, a process of the power system 1 according to an embodiment of the present invention will be described with reference to FIG. 4.

The weather predictor 401 acquires weather information indicating prediction of weather at the predetermined time later from a database DB or the like of a company providing the weather information via, for example, the communication line NW such as the Internet (step S1).

The power generation amount predictor 402 predicts an amount of power generated by the first power supply device 20 at the predetermined time later based on the weather information acquired by the weather predictor 401 (step S2).

The demand specifier 403 specifies the power demand at the predetermined time later (step S3).

The supply amount acquirer 404 predicts whether the power supplied to the load 10 at the predetermined time later is insufficient at a normal time (step S4). Specifically, the supply amount acquirer 404 determines that the power supplied to the load 10 at the predetermined time later is insufficient when the amount of generated power at the predetermined time later predicted by the power generation amount predictor 402 is less than the power demand at the predetermined time later specified by the demand specifier 403. The supply amount acquirer 404 determines that the power supplied to the load 10 at the predetermined time later is sufficient when the amount of generated power at the predetermined time later predicted by the power generation amount predictor 402 is greater than the power demand at the predetermined time later.

The supply amount acquirer 404 returns the process to step S1 when the power supplied to the load 10 at the predetermined time later is predicted to be sufficient at the normal time (NO in step S4).

When the power supplied to the load 10 at the predetermined time later is predicted to be insufficient at the normal time (YES in step S4), the supply amount acquirer 404 transmits a request for the maximum suppliable power amount which can be supplied at the predetermined time later to the power generation operator side computer 50 (step S5). At this time, the supply amount acquirer 404 simultaneously transmits the request for the maximum suppliable power amount which can be supplied at the predetermined time later and information regarding a fee corresponding to an increase in the supplied power.

The request acquirer 501 receives an inquiry about the maximum suppliable power amount which can be supplied at the predetermined time later (a request for the maximum suppliable power amount at the predetermined time later) from the system operator side computer 40 (step S6).

The supply amount specifier 502 calculates the maximum suppliable power amount at the predetermined time later (step S7).

The supply amount notifier 503 transmits the maximum suppliable power amount at the predetermined time later calculated by the supply amount specifier 502 to the system operator side computer 40 (step S8).

The supply amount acquirer 404 receives the maximum suppliable power amount at the predetermined time later from the power generation operator (step S9). When a total sum of the received maximum suppliable power amounts exceeds an amount of actually necessary power, for example, the supply amount acquirer 404 may determine a priority such as an order in which a response becomes earlier (a reception order) or an order in which a power fee becomes lower and obtain an amount of necessary power.

The shortage determiner 405 determines whether the power demand at the predetermined time later is greater than the maximum suppliable power amount at the predetermined time later (step S10). Specifically, when the shortage determiner 405 determines that the power demand at the predetermined time later specified by the demand specifier 403 is equal to or less than the maximum suppliable power amount at the predetermined time later calculated by the supply amount specifier 502 (NO in step S10), the shortage determiner 405 determines that the power supplied to the load 10 at the predetermined time later is sufficient and returns the process to step S1.

Conversely, when the shortage determiner 405 determines that the power demand at the predetermined time later specified by the demand specifier 403 is greater than the maximum suppliable power amount at the predetermined time later calculated by the supply amount specifier 502 (YES in step S10), the shortage amount calculator 406 calculates a difference between the power demand at the predetermined time later and the total amount of the amount of power generated by the first power supply device 20 at the predetermined time later and the maximum suppliable power amount at the predetermined time later as a power shortage amount (step S11).

The demand response unit 407 requests demand response based on the amount of power shortage calculated by the shortage amount calculator 406, that is, notifies the consumers of reduction amounts of the loads 10 and an incentive which could be obtained when the loads 10 are reduced (step S12).

The consumers notified of the request for the demand response determine whether to receive the request for the demand response, that is, determine whether to obtain the incentive by reducing the loads 10. Then, the consumers perform a process in accordance with a determination result.

The power system 1 according to the embodiment of the present invention has been described above.

The system operator side computer 40 included in the power system 1 calculates the difference between the power demand at the predetermined time later and the total sum of the amount of power generated by the first power supply device 20 at the predetermined time later and the maximum suppliable power amount at the predetermined time later as the power shortage amount.

The power generation operator side computer 50 included in the power system 1 acquires a request for the maximum suppliable power amount at the predetermined time later, calculates the maximum suppliable power amount, and notifies the system operator of the calculated maximum suppliable power amount.

In this way, the power system 1 including the system operator side computer 40 can specify a power shortage amount necessary to accurately specify the maximum suppliable power amount. The power system 1 including the power generation operator side computer 50 can accurately specify the maximum suppliable power amount.

The power system 1 including the system operator side computer 40 and the power generation operator side computer 50 can appropriately request demand response (for suppressing the amount of power consumption at the time of power shortage) to each consumer based on the power shortage amount and can determine a suppliable power amount in accordance with a profit of each of the system operator and the power generation operator.

In the embodiment of the present invention, the first power supply device 20 is the device owned by at least one of the consumer and the system operator, as described above. In another embodiment of the present invention, however, the first power supply device 20 may be a device owned by the power generation operator.

In an embodiment of the present invention, the second power supply device 30 may be a device that can supply predetermined power to the load 10 at a normal time and may be a device that can increase or decrease power to be supplied to the load 10 with reference to the predetermined power. In another embodiment of the present invention, the second power supply device 30 may be a device that does not supply power to the load 10 at a normal time and may be device that does not supply power to the load 10 or supplies the power and increase or decrease the supply amount.

In the embodiment of the present invention, the second power supply device 30 is, for example, the device that supplies power generated by such as thermal power generation using a fossil fuel, as described above. However, in still another embodiment of the present invention, the second power supply device 30 may be a device that includes, for example, a device supplying power generated using renewable energy such as solar energy, wind energy, or hydroelectric energy. When the second power supply device 30 is a device that supplies power generated using renewable energy such as solar energy, wind energy, or hydroelectric energy, the power generation operator side computer 50 may predict an amount of generated power based on weather.

In the embodiment of the present invention, the supply amount acquirer 404 transmits the information regarding the fee corresponding to an increase in the supplied power to the power generation operator side computer 50 along with the request for the maximum suppliable power amount which can be supplied at the predetermined time later, as described above. In still another embodiment of the present invention, however, a fee corresponding to an increase in power supplied may be suggested by the power generation operator side computer 50 (for example, the supply amount notifier 503) and the maximum suppliable power amount may be transmitted to the system operator side computer 40 by using the suggested fee as a condition.

Herein, the power generation operator side computer 50 is not limited to one power generation operator side computer 50, and may be the power generation operator side computer 50 owned by each of a plurality of power generation operators. When the number of power generation operator side computers 50 of transmission destinations is plural, the supply amount acquirer 404 may transmit a request for the maximum suppliable power amount which can be supplied at the predetermined time later and may simultaneously transmit an intention to bid for a fee corresponding to an increase in the supplied power. When the bid is made, the supply amount acquirer 404 suggests, for example, an amount of generated power of a bidding target and a fee (corresponding to a lowest contract price of a general bid) per unit power for the amount of generated power.

Even in the case of the suppliable power amount within the initial contract range, the power generation operator cannot increase power to be supplied to the load 10 in some cases since the amount of power supplied to another load has already increased. In this case, the demand response unit 407 may request demand response to the system operator, that is, instead of not increasing the power to be supplied despite being within the contract power, may request the system operator side computer 40 to provide an incentive for the non-increase.

An order of the processes in the embodiment of the present invention may be switched within a range in which the processes are appropriately performed.

The storage unit and each of the other storage devices in the embodiment of the present invention may be included anywhere within a range in which information is appropriately transmitted and received. The plurality of storage units and the other storage devices may be located within the range in which information is appropriately transmitted and received so that data can be distributed and stored.

The embodiments of the present invention have been described, but the power system 1, the system operator side computer 40, the power generation operator side computer 50, and the other control devices described above may have an internal computer system. The procedure of the above-described processes is stored in a computer-readable recording medium in a program form, and a computer reads and executes the program to perform the processes. A specific example of the computer is as follows.

Figure 5:
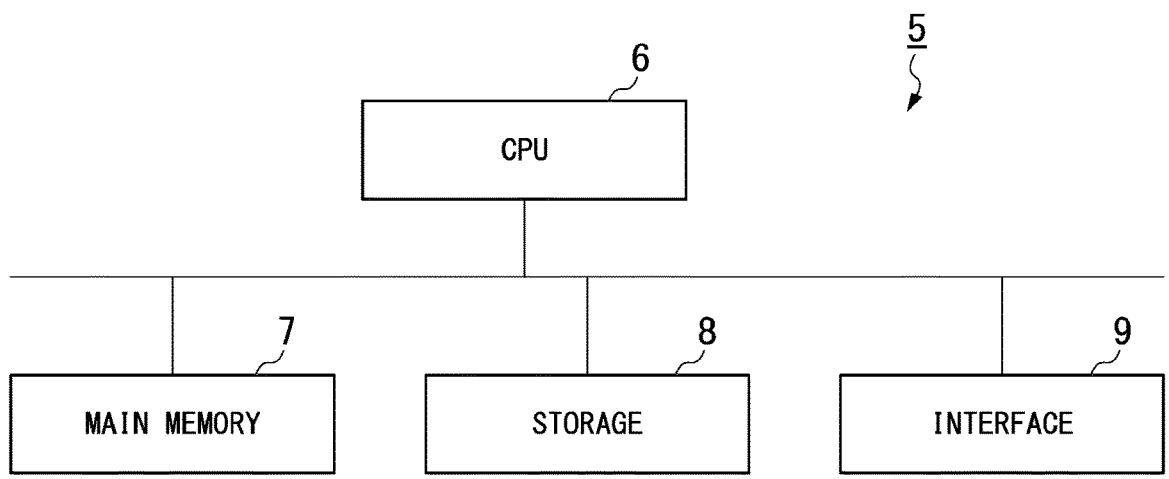
FIG. 5 is a schematic block diagram illustrating a configuration of a computer according to at least one embodiment.

FIG. 5 is a schematic block diagram illustrating a configuration of a computer according to at least one embodiment.

As illustrated in FIG. 5, a computer 5 includes a CPU 6, a main memory 7, a storage 8, and an interface 9.

For example, the power system 1, the system operator side computer 40, the power generation operator side computer 50, and the other control devices described above are each mounted on the computer 5. An operation of each of the described-above processors is stored in the storage 8 in a program form. The CPU 6 reads the program from the storage 8, loads the program on the main memory 7, and performs the processes in accordance with the program. The CPU 6 guarantees a storage area corresponding to each of the above-described storage units in the main memory 7 in accordance with the program.

Examples of the storage 8 include a hard disk drive (HDD), a solid-state drive (SSD), a magnetic disk, an electro-magnetic disk, a compact disc read-only memory (CD-ROM), a digital versatile disc read-only memory (DVD-ROM), a semiconductor memory, or the like. The storage 8 may be an internal medium directly connected to a bus of the computer 5 or may be an external medium connected to the computer 5 via the interface 9 or a communication line. When the program is delivered to the computer 5 via the communication line, the computer 5 loads the delivered program on the main memory 7 to perform the processes. According to at least one embodiment, the storage 8 is a non-transitory storage medium.

The program may realize some of the above-described functions. Further, the program may be a file, a so-called differential file (differential program), which can be realized by combining the above-described functions with a program previously recorded on a computer system.

Several embodiments of the present invention have been described, but these embodiments are merely exemplary and do not limit the scope of the present invention. Various additions, omissions, or substitutions of these embodiments may be made within the scope of the present invention departing from the gist of the present invention.

INDUSTRIAL APPLICABILITY

A system operator side computer, a power generation operator side computer, a power system, a control method, and a program according to embodiments of the present invention can accurately specify a suppliable maximum power amount in the power system.

REFERENCE SIGNS LIST

1 Power system
5 Computer
6 CPU
7 Main memory
8 Storage
9 Interface
10 Load
20 First power supply device
30 Second power supply device
40 System operator side computer
50 Power generation operator side computer
401 Weather predictor
402 Power generation amount predictor
403 Demand specifier
404 Supply amount acquirer
405 Shortage determiner
406 Shortage amount calculator
407 Demand response unit
501 Request acquirer
502 Supply amount specifier
503 Supply amount notifier
DB Database
SG Smart grid

The invention claimed is:

1. An operator side power supply manager device, comprising:

a memory storing computer-readable instructions; and
a processor, coupled to the memory, the processor configured to execute the computer-readable instructions to:
apply a first power amount to a load using a weather dependent power supply device;
apply a second power amount to a load using a weather independent power supply device;
receive weather information over a network;
predict the first amount of power applied to the load by the weather dependent power supply device at a predetermined time based on the received weather information;
determine a total power amount comprising a sum of the predicted first amount of power applied to the load by the weather dependent power supply device at the predetermined time based on the received weather information and a second amount of power applied to the load at the predetermined time by the weather independent power supply device;
determine whether the total power amount applied to the load at the predetermined time is insufficient to meet a power demand of the load at the predetermined time;
when the total power amount is determined to be insufficient at the predetermined time, determine an increase to the second amount of power to apply to the load at the predetermined time by the weather independent power supply device to meet the power demand of the load; and
apply the increase to the load at the predetermined time.

2. The operator side power supply manager device of claim 1, wherein the processor is further configured to receive the weather information comprising a weather forecast for the predetermined time and past results for an amount of light available to the weather dependent power supply device at the predetermined time, the processor using the weather forecast for the predetermined time and past results for the amount of light available to the weather dependent power supply device at the predetermined time to predict the first amount of power applied to the load by the weather dependent power supply device at the predetermined time.

3. The operator side power supply manager device of claim 1, wherein the processor is further configured to, based on the weather information, calculate the increase of the second amount of power to meet the power demand of the load at the predetermined time.

4. The operator side power supply manager device of claim 1, wherein the processor is further configured to receive a maximum suppliable power amount from the weather independent power supply device.

5. The operator side power supply manager device of claim 4, wherein the processor is further configured to determine whether the increase to the second amount of power applied to the load at the predetermined time by the weather independent power supply device is greater than the maximum suppliable power amount of the weather independent power supply device.

6. The operator side power supply manager device of claim 5, wherein the processor is further configured to transmit a request to the load to reduce the amount of power consumption at the predetermined time.

7. A power system comprising:
an operator side power supply manager device; and
a power generation manager device,
wherein the operator side power supply manager device includes
a first memory storing first computer-readable instructions; and
a first processor, coupled to the first memory, the first processor configured to execute the first computer-readable instructions to:
apply a first power amount to a load using a weather dependent power supply device;
apply a second power amount to a load using a weather independent power supply device;
receive weather information over a network;
predict the first amount of power applied to the load by the weather dependent power supply device at a predetermined time based on the received weather information;
determine a total power amount comprising a sum of the predicted first amount of power applied to the load by the weather dependent power supply device at the predetermined time based on the received weather information and a second amount of power applied to the load at the predetermined time by the weather independent power supply device;
determine whether the total power amount applied to the load at the predetermined time is insufficient to meet a power demand of the load at the predetermined time;
when the total power amount is determined to be insufficient at the predetermined time, determine an increase to the second amount of power to apply to the load at the predetermined time by the weather independent power supply device to meet the power demand of the load; and
apply the increase to the load at the predetermined time; and
wherein the power generation manager device includes
a second memory storing second computer-readable instructions; and
a second processor, coupled to the second memory, the second processor configured to execute the second computer-readable instructions to:
receive a request from the operator side power supply manager device for a maximum suppliable power amount of the weather independent power supply device at the predetermined time;
calculate the maximum suppliable power amount of the weather independent power supply device at the predetermined time; and
transmit the maximum suppliable power amount of the weather independent power supply device to the operator side power supply manager device.

8. A control method of an operator side power supply manager device, comprising:
applying a first power amount to a load using a weather dependent power supply device;
applying a second power amount to a load using a weather independent power supply device;
receiving weather information over a network;
predicting the first amount of power applied to the load by the weather dependent power supply device at a predetermined time based on the received weather information;
determining a total power amount comprising a sum of the predicted first amount of power applied to the load by the weather dependent power supply device at the predetermined time based on the received weather information and a second amount of power applied to the load at the predetermined time by the weather independent power supply device;

determining whether the total power amount applied to the load at the predetermined time is insufficient to meet a power demand of the load at the predetermined time;

when the total power amount is determined to be insufficient at the predetermined time, determining an increase to the second amount of power to apply to the load at the predetermined time by the weather independent power supply device to meet the power demand of the load; and applying the increase to the load at the predetermined time.

9. A non-transitory computer-readable media having computer-readable instructions stored thereon, which when executed by a processor causes the processor to perform operator side power supply management operations comprising:

applying a first power amount to a load using a weather dependent power supply device; applying a second power amount to a load using a weather independent power supply device;

receiving weather information over a network;

predicting the first amount of power applied to the load by the weather dependent power supply device at a predetermined time based on the received weather information;

determining a total power amount comprising a sum of the predicted first amount of power applied to the load by the weather dependent power supply device at the predetermined time based on the received weather information and a second amount of power applied to the load at the predetermined time by the weather independent power supply device;

determining whether the total power amount applied to the load at the predetermined time is insufficient to meet a power demand of the load at the predetermined time;

when the total power amount is determined to be insufficient at the predetermined time, determining an increase to the second amount of power to apply to the load at the predetermined time by the weather independent power supply device to meet the power demand of the load; and applying the increase to the load at the predetermined time.

10. The non-transitory computer-readable media of claim 9, further comprising:

receiving the weather information comprising a weather forecast for the predetermined time and past results for an amount of light available to the weather dependent power supply device at the predetermined time;

using the weather forecast for the predetermined time and past results for the amount of light available to the weather dependent power supply device at the predetermined time to predict the first amount of power applied to the load by the weather dependent power supply device at the predetermined time; and based on the prediction of the first amount of power applied to the load by the weather dependent power supply device at the predetermined time, determining the increase of the second amount of power to meet the power demand of the load at the predetermined time.

11. The non-transitory computer-readable media of claim 10, further comprising receiving a maximum suppliable power amount from the weather independent power supply device;

determining whether the increase to the second amount of power applied to the load at the predetermined time by the weather independent power supply device is greater than the maximum suppliable power amount of the weather independent power supply device; and transmitting a request to the load to reduce the amount of power consumption at the predetermined time.

* * * * *